(12) United States Patent
Manneschi et al.

(10) Patent No.: US 7,889,076 B2
(45) Date of Patent: Feb. 15, 2011

(54) SYMMETRIC MULTIPLE SENSING APPARATUS

(76) Inventors: Alessandro Manneschi, 15, Via XXV Aprile, I-52100 Arezzo (IT); Giovanni Manneschi, Via XXV Aprile, 17, 52100 Arezzo (IT)

(*) Notice: Subject to any disclaimer, the term of this patent is extended or adjusted under 35 U.S.C. 154(b) by 0 days.

(21) Appl. No.: 11/499,072

(22) Filed: Aug. 3, 2006

(65) Prior Publication Data

US 2007/0030141 A1 Feb. 8, 2007

(30) Foreign Application Priority Data

Aug. 4, 2005 (EP) ................................. 05291666

(51) Int. Cl.
*G08B 13/26* (2006.01)
*G08B 13/14* (2006.01)

(52) U.S. Cl. ..................................... 340/561; 340/572.4
(58) Field of Classification Search ................. 340/561, 340/572.4
See application file for complete search history.

(56) References Cited

U.S. PATENT DOCUMENTS

| 4,866,424 | A | | 9/1989 | Parks |
| 5,249,612 | A | * | 10/1993 | Parks et al. ................. 141/219 |
| 5,345,222 | A | * | 9/1994 | Davies et al. ............ 340/572.7 |
| 5,397,986 | A | | 3/1995 | Conway et al. |
| 5,406,259 | A | | 4/1995 | Manneschi |
| 5,680,103 | A | | 10/1997 | Turner et al. |
| D386,102 | S | * | 11/1997 | Manneschi ................. D10/106 |
| 5,859,532 | A | | 1/1999 | Keller |
| 5,992,094 | A | | 11/1999 | Diaz |
| 6,076,303 | A | * | 6/2000 | Orsini .......................... 49/68 |
| 6,239,423 | B1 | * | 5/2001 | Hama et al. ................. 250/221 |
| 6,362,739 | B1 | * | 3/2002 | Burton .................... 340/572.6 |
| 6,394,356 | B1 | * | 5/2002 | Zagami ...................... 235/487 |
| 2004/0000999 | A1 | * | 1/2004 | Turner et al. ............. 340/572.4 |
| 2004/0140798 | A1 | | 7/2004 | Manneschi |
| 2004/0207528 | A1 | * | 10/2004 | Fabian et al. ............. 340/572.6 |
| 2006/0158331 | A1 | * | 7/2006 | Massengill et al. .......... 340/551 |
| 2006/0207348 | A1 | * | 9/2006 | Brandl ................... 73/862.331 |

FOREIGN PATENT DOCUMENTS

| EP | 1 219 976 | 7/2002 |
| WO | WO-03/069320 | 8/2003 |

* cited by examiner

*Primary Examiner*—Daniel Wu
*Assistant Examiner*—John F Mortell
(74) *Attorney, Agent, or Firm*—Blakely, Sokoloff, Taylor & Zafman LLP

(57) ABSTRACT

An apparatus for metal detection is provided. The metal detector is used to provide protected access to sensitive areas. The metal detector includes two oblong shape vertical housings and emitting and receiving electrical coils which are provided in the housings. Further, at least one additional type of sensor is provided in at least one of the housings. The coils and additional sensors are symmetrically provided in at least one of the housings so as to present physical and geometrical coincidence detection.

34 Claims, 6 Drawing Sheets

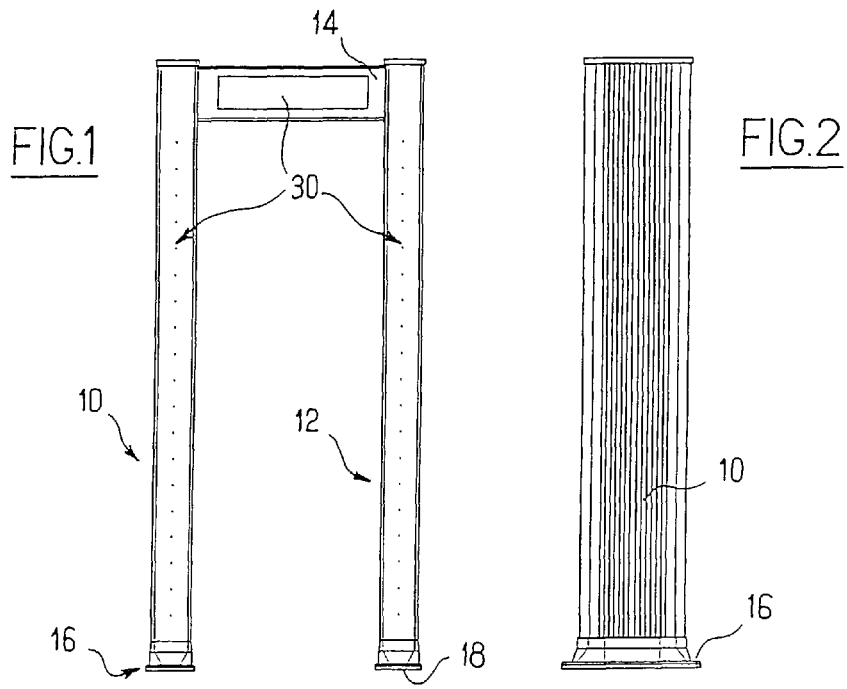
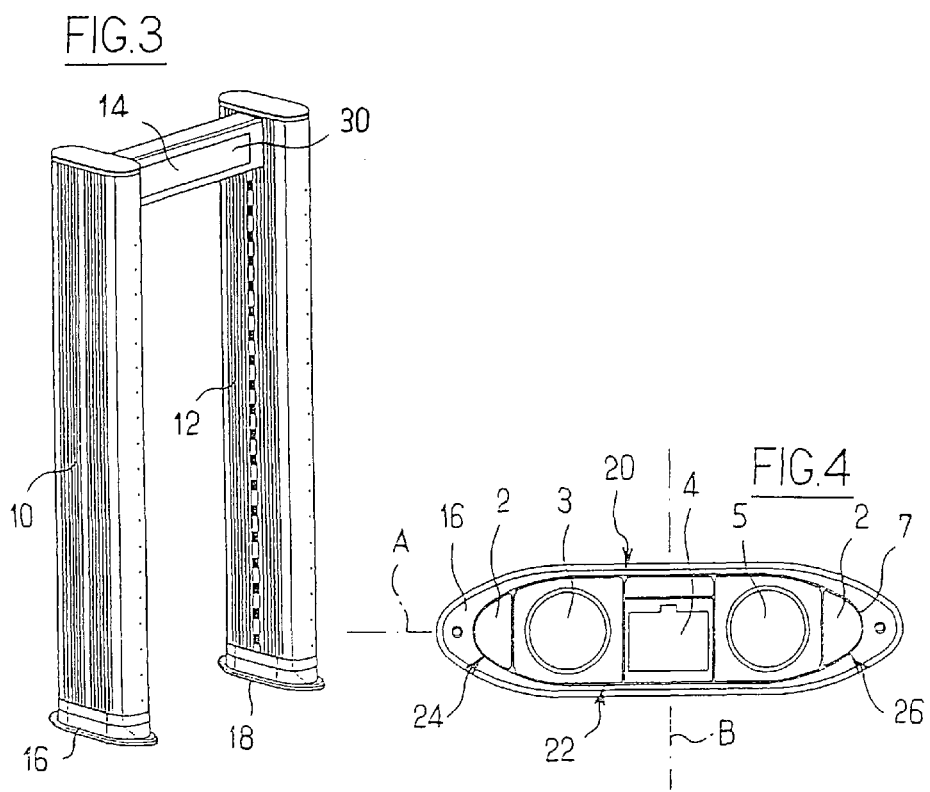

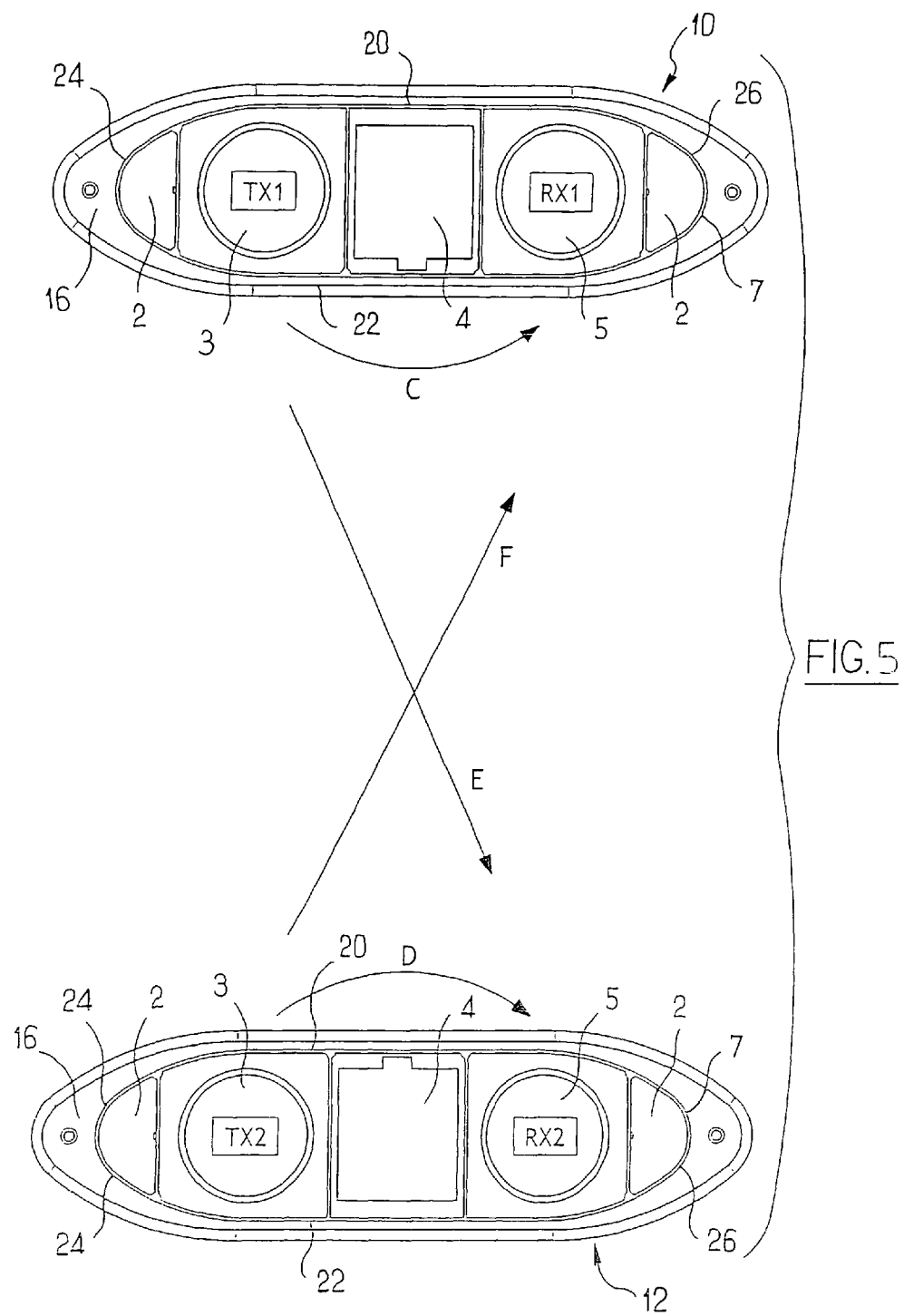

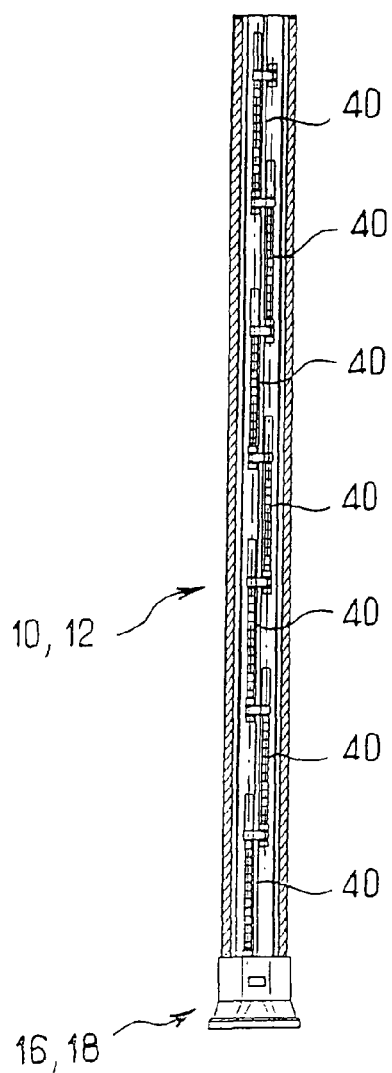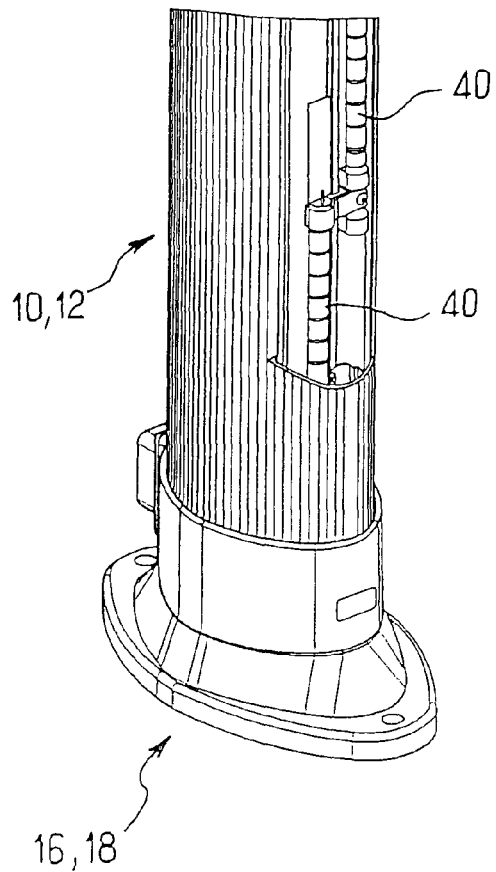

SYMMETRIC MULTIPLE SENSING APPARATUS

BACKGROUND OF THE INVENTION

The present invention relates to the technical field of detectors, such as metal detectors, designed for detecting non-authorized objects in a zone having protected access.

More precisely the present invention relates to the field of the metal detectors provided to detect arms in airport or similar other sensitive areas, such as in official offices, Minister Buildings, schools, banks and so on.

Many kinds of metal detectors have been still disclosed.

Most of the metal detectors which are used todays in airport are in the form of a channel or portal comprising two vertical walls housing specific electric coils connected to a control unit, said two vertical walls being connected at their top side by a transverse horizontal beam.

Generally the coils housed in the walls are planar.

Examples of such known metal detectors are disclosed in the following prior art documents FR-2720519, FR-2775350, FR-2780585, FR-2694098, FR-2697919, FR-2698178, FR-2698968, FR-2608286, FR-2610417, FR-2607937, FR-2608286, FR-2607937, U.S. Pat. Nos. 6,362,739, 6,359,582, 6,344,818, 6,342,696, 6,218,830, 5,790,685, 5,680,103, 5,341,126, WO03/032011, US-20010042412, WO98/12573, WO97/50000, WO97/42527, EP-0740822, EP-0490921, WO91/03746, U.S. Pat. No. 5,121,105, WO88/07733, US-20030142853, US-20030128150, U.S. Pat. Nos. 6,507,309, 6,507,278, US-20020130804, U.S. Pat. Nos. 6,359,582, 6,150,810, 6,133,829, 5,726,628, 5,600,303, 5,692,029, 5,689,184, 5,227,800, 5,073,782, 5,039,981, 4,866,439, 4,866,424, 4,263,551, 4,019,053, 4,012,690, 3,971,983, 3,707,672, 4,987,767, 5,109,691, 4,449,115.

In some other metal detectors the coils are not planar but in form of a helicoïdal or spiral winding(s) around a vertical and generally cylindrical support. These metal detectors comprising helicoïdal or spiral winding(s) are generally named "column detectors". In view of the first cited detectors comprising planar coils, the metal detectors including helicoïdal or spiral winding offer advantages in term of compacity and esthetic.

Examples of column detectors are disclosed in the following prior art documents FR-A-2607937, IT00072791, IT1214991.

The prior art document WO03/069320 discloses a metal detector comprising a metal detection subsystem, a radiation detection system and a presence detection subsystem. All those detection subsystems are aligned one behind another without any advantages in term of compacity. In some circumstances, the device disclosed in WO03/069320 leads to false or not reliable detections.

SUMMARY OF INVENTION

The aim of the present invention is now to propose a new metal detector which presents detecting properties which are superior to those of the known devices.

In particular an auxiliary aim of the present invention is to propose a new detector which is not limited to detection of metal but which is suitable to detect also other kinds of attack means.

A specific aim of the present invention is to propose a new metal detector which presents a good esthetic and which is not cumbersome so that said detector may be used in any place including the hall of select building such as hotels, banks and so on.

The above aims are resolved according to the present invention with a detector comprising two oblong shape vertical housings, and emitting and receiving electrical coils provided in said housings, characterized in that at least an additional type of sensors is provided in at least one of said housings, said coils and additional type of sensors being symmetrically provided in said at least one of said housings so as to present a physical and geometrical coincidence detections.

Preferentially said additional type of sensors is chosen in the group comprising at least one sensor suitable to detect ionizing radiations, at least one sensor suitable to detect the presence of explosive material or other specific substances, at least one sensor suitable for the badge readings of persons in transit.

BRIEF DESCRIPTION OF THE DRAWING

Other characteristics, objects and advantages of the present invention appear on reading the following detailed description and from the accompanying drawings given as non-limiting examples, and in which FIGS. 1 and 2 illustrates two lateral view of a detector in accordance with the present invention, FIG. 3 is a perspective view of the same detector in accordance with the present invention, FIG. 4 is a cross horizontal section of a housing in accordance with the present invention, FIG. 5 is a cross horizontal section of a multi-sensorial control system portal in accordance with the present invention using two column coils in each housing, respectively as a transmitter and a receiver one, FIG. 7 illustrates a lateral and partially cutted view of a housing in accordance with the present invention comprising a plurality of X/Gamma sensors staggered in the height of the housing, FIG. 8 illustrates a similar, partial and enlarged view of the same housing.

DETAILED DESCRIPTION OF THE INVENTION

Figure 6:
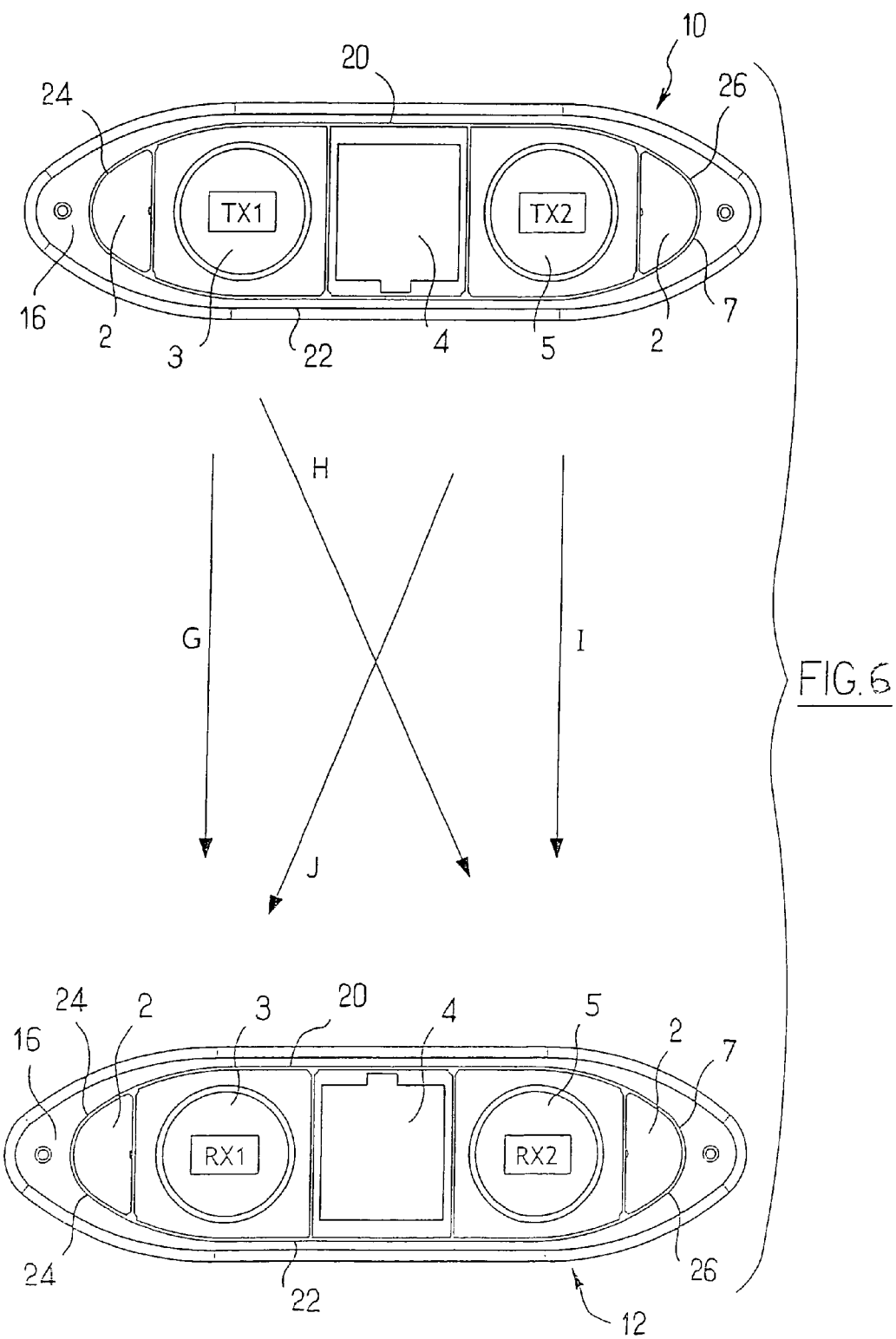
FIG. 6 is a cross horizontal section of a multi-sensorial control system portal in accordance with an alternative of the present invention, wherein each one of the two housings comprises two emitting coils or two receiving coils.

The detector of the invention is a multi-sensorial control system composed of two oblong and vertical shape housings 10, 12, surmounted by a connecting structure 14, and both of them supported by an oblong shape base 16, 18 of support that can be fixed at the floor and that does not present any edge, in order to avoid damages to persons in transit caused by accidental impacts.

The same enclosures or housings 10, 12, placed one in front of the other, basically form two surfaces that, surmounted by a box shape cross bar 14, constitute a portal used for the inspection of people passing through.

The two vertical enclosures 10, 12 house emitting and receiving coils associated with control means suitable to analyse electrical signals issued from the coils to detect metal pieces passing through the portal, between the two housings 10, 12. Such emitting and receiving coils and such control means are well-known for the man skilled in the art. Consequently such coils and such control means will not be described in detail in the following specification.

The portal in accordance with the invention differs from the other devices in use at present, as for instance the portals used in some airports, for additional control instruments located into its side enclosures 10, 12, together with the metal detector. The enclosures 10, 12 of the invention, can house one or more than one metal detector, one or more than one sensor suitable to detect ionizing radiations, one or more than one sensor suitable to signal the presence of explosive material as well as other substances, one or more sensors suitable for the badge reading of persons in transit.

These portals, as shown in FIGS. 1 to 3, appear as oblong shape housings, similar to those represented in the Italian patent no 00072791, but further lengthened as shown in FIG. 4 that shows, in reference 16, the boot or supporting base of an enclosure 10; in reference 2 a signalling displays indicating the transit height which refers to the detected materials such as: metal masses, radioactive elements, unusual chemical substances, badges and so on (preferably in accordance with the invention all the information issued by the plurality of sensors, such as metal, radioactive, chemical or badge sensors, are displayed on a common signalling display 2); in reference 3 a first column type metal detector (or coil), similar to the one represented in the Italian patent no 1214991 of the same author, and a badge reader; in reference 5 a second metal detector (or coil), with or without a badge reader (Preferentially the second metal detector 5 is also a column type metal detector similar to the one represented in the Italian patent no 1214991); in reference 4, a space between said first and second metal detectors 3 and 5, where sensors suitable to detect chemical substance molecules or other sensor such as badge sensor are vertically placed. In the same space 4 are also placed and vertically assembled ionizing radiation sensors. The point 7 shows the oblong shape housing that, similar to an ellipse, gave the structure an harmonic solution, making the transit, as well as the controller's inspection, much easier. More precisely according to FIG. 4 the two metal detectors 3 and 5 are symmetrically disposed about the additional type of sensors 4, respectively on each side of this one.

Typically but without any limitation, the ratio between the length and the width of the cross section of the housings 10, 12 is between 2 and 4, preferably about 2.75.

Moreover length of the cross section is typically between 60 and 100 cm preferably about 80 cm while the width of the cross section is typically between 20 and 35 cm preferably about 27.5 cm.

In one embodiment but without any limitation the external surface of the housing comprises two plane and parallel panels 20, 22, connected at their ends by two rounded parts 24, 26.

Preferentially the housings 10, 12 in accordance with the invention have two perpendicular planes of symmetry A and B.

Figure 11:
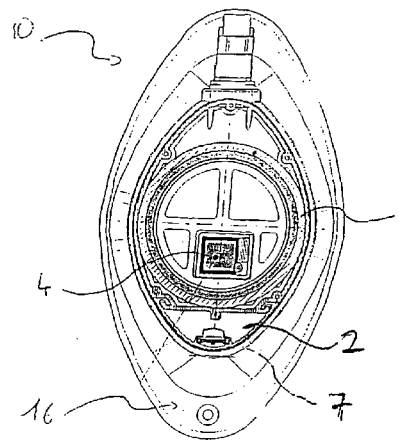
FIG. 11 is a cross horizontal section of a housing in accordance with the present invention.

FIG. 11 illustrates an embodiment in accordance with the invention wherein a housing 10 houses a metal detector or coil 3 (Preferentially a column type metal detector similar to the one represented in the Italian patent no 1214991) and an additional type of sensor 4 provided inside said coil 3, essentially symmetrically in regard of said coil 3 so as to provide a physical and geometrical coincidence detection.

Figure 12:
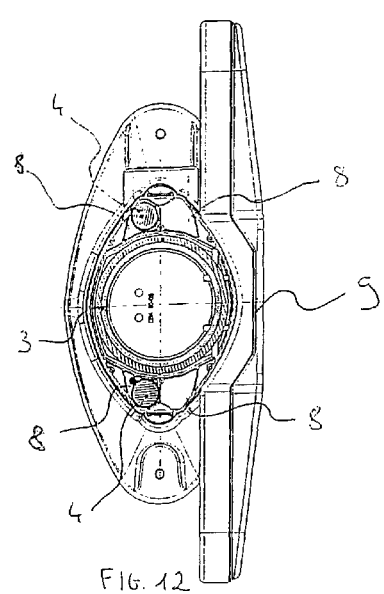
FIG. 12 is a similar cross horizontal section of another variant of housing in accordance with the present invention.

In FIG. 12, the column type metal detector is surrounded by four cavities 8 symmetrically disposed about the said column type metal detector (or coil) 3. Some additional types of sensors 4 are placed vertically in those cavities. The additional types of sensors 4 are symmetrically disposed about the column type metal detector in at least two cavities 8. Preferentially, said additional types of sensors are radiation sensors 4. The more radiation sensors there are, the more the system is responsive. In fact, the responsiveness of the system is proportional to the volume of the radiation sensor material used. The configuration illustrated in FIG. 12 is equivalent to one responsive radiation sensor inside the column type metal detector.

The present invention may also applies to flat panel metal detector. In other words, according to the present invention, a flat panel metal detector may include for example a central coil metal detector and two additional sensors, one additional sensor respectively on each side of the central coil metal detector, or a coil metal detector and one or a plurality of additional sensor(s) inside said coil metal detector.

Figure 14:
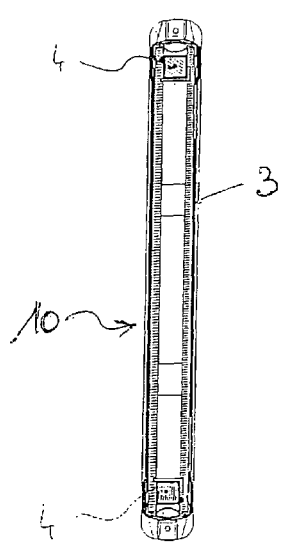
FIG. 14 is a cross horizontal section of a housing in accordance with an embodiment in form of a panel detector of the present invention.

FIG. 14 illustrates an embodiment of such a flat panel metal detector wherein the housing 10 which has an appreciably elongate and rectangular horizontal cross section houses a classical coil 3 and two additional type of sensors 4 inside said coil 3. More precisely said two sensors 4 extend vertically and are provided respectively in the vicinity of the ends of the horizontal loops of said coil 3. Such a structure of coil for flat panel metal detector is well known for the man skilled in the art and will not be described in detail in the following description. Here again, the sensors 4 and the coil are symmetrical so as to provide physical and geometrical coincidence detections.

Such sensorial structure organization, is considered optimal for the improvement of the present state-of-the-art which requires, for obtaining the same result, the installation of several and spatially separated devices such as a walk through metal detector, a badge reader, a walk explosive detector, a ionizing radiation detectors and so on.

If required, the same housings 10, 12 can be further lengthened so that to allow the positioning of additional transducers, or shortened by reducing the number of the transducers themselves, but without altering the inventive concept of the device that, in this solution, finds a rational, functional and compatible disposition of the instruments.

In fact, the configuration of FIG. 4 described above, is of smaller dimensions as regards the ones of the panel type walk through metal detectors in use at present in the market. Furthermore, it has the advantage of a particular rounded section without any corner. The oblong configuration, tapered at the ends, creates a nearly elliptical section, thus allowing its widen central body to house the above mentioned instruments.

This configuration grants additional stability to the portal's supporting surface.

The two housings 10, 12 placed one in front of the other, basically form the walls where people pass through for the inspection and they are connected by two cross bars or by a box structure 14 positioned at the top of the portal, that makes the gate stable and architectonically more agreeable. For aesthetical reasons, the walls can be smooth or striped with omega shape indentations, suitable to reduce the reflections of light or defects such as scratches or dirt caused by the use of the device itself.

The display zones 30, which are positioned in the front and in the rear sides of the gate, remain prevalently smooth. The cross bar or box structure 14 positioned above, could cover totally or partially the transit width according to the esthetical and functional requirements of the device.

Also the upper structure 14 could be made of one or more than one basic cross bar or by a box connection, suitable to contain the electronic equipments which refer to the transducers installed. It could also be constituted by cross bars suitable to contain all or a part of the control electronic equipments.

The choice to dispose the sensitive transducers 3, 4, 5, into both walls, constituted by the containers 10, 12 mentioned above, can be modified without altering the validity of the device that should include the detection equipments in a single system that, in this specific case, results to be a gate. This allows to save space, time of inspection and controllers, as required by those strategic applications such as airports embassies and others, thus improving the transit flow and reducing inconveniences to passengers.

In particular combining all the sensors in the same housings 10, 12, allows to increase the liability of the checking and allows to reduce the number of people in charge of the checking and consequently the overall cost of the checking.

In case some equipments shouldn't be necessary, they could be removed reducing the functions of the system without altering the validity of the invention that, in its basis statement, as shown in the drawing, provides an essential and valid solution for the achievement of the above said advantages.

This multi-sensorial portal can be provided with a display, turned to the passenger in transit. The passenger will be informed by the display if to stop, by means of a "stop" signal, to proceed by means of a "go" signal or he could receive other information. The signals could be visual and/or acoustical.

The system, providing instructions to the passenger, could solve automatically the control activity. Therefore, the person in charge for the surveillance will be only engaged in the supervision of the correct procedure.

The man skilled in the art will appreciate that the detector in accordance with the present invention solve the conditions of security, esthetic and operation now requested in many official, public or private places, especially in airports. Although the narrow spaces available close to the gates do not allow install several equipments, the invention proposes a complete multi-sensorial device which offers additional advantages such as a reduced impact for passengers, fast inspections, easy control, a reduced number of controllers at the gates, thus saving space as above described. Moreover, the symmetrical disposition of the coils 3, 5 and the additional types of sensors 4 is a solution to have a physical and geometrical coincidence. Due to this physical and geometrical coincidence, the analysis provided by a central unit receiving both signals issued by the coils 3, 5 on a one side and the sensors 4 on the other side relates automatically to the same physical entity passing through the portal. In other words it is equivalent to a detector comprising different sensors inspecting the same part of the space at the same time. The invention solves the problem of spatial and temporal simultaneity. It is important to detect simultaneously metal and radiation phenomenon. In fact, the radioactive sources are mainly transported in metal, commonly lead, casings. The passage of that kind of casings over that multi-sensorial gate results in simultaneous changes in both signals. This is a solution to avoid any confusion with radiation signal of a first person with the metal signal of a second one.

Contrarily prior art document WO 03/069320 which teaches juxtaposed, but not symmetrical, detection subsystems, may lead to false or not reliable detections due to the fact that the metal detection subsystem and the radiation detection subsystem may issue respectively signals relating to two different physical entities passing through the portal.

Of course the invention is not limited to the specific above described embodiments. The invention covers all the embodiments defined in the enclosed claims.

As indicated above preferentially each of the two housings 10, 12 comprises two separate emitting TX and/or receiving coils RX, and the detector comprises means controlling operation of said emitting and receiving coils so that when an emitting coil provided in a housing is active, two other and spatially separate receiving coils are also simultaneously or subsequently active.

FIG. 5 illustrates the cross horizontal section of a multi-sensorial control system portal in accordance with a specific embodiment of the present invention using two column coils 3, 5, in each housing 10, 12, respectively as a transmitter and a receiver one.

More precisely, coil 3 of housing 10 is a transmitter one referenced TX1, coil 5 of housing 10 is a receiver one referenced RX1, coil 3 of housing 12 is transmitter one referenced TX2 and coil 5 of housing 12 is a receiver one referenced RX2. In other words a first transmitter coil TX1 and a first receiver coil RX1 are placed on one side in a housing 10 and a second transmitter coil TX2 and a second receiver coil RX2 are placed on the other side in the second housing 12. The RX1 coil receives the signal issued by the TX1 coil, scanning the volume adjacent to the housing 10 it belongs to. The same RX1 coil receives also the signal issued by the second transmitter coil TX2, prospecting the whole transit volume according to the related diagonal. The same behaviour applies to RX2.

In other words according to FIG. 5 each of the two housings 10, 12 comprises one emitting coil TX and one receiving coil RX and the detector comprises means controlling operation of said emitting TX and receiving RX coils so that when an emitting coil TX provided in a housing 10 or 12 is active, the two receiving coils RX provided respectively in both the two housings 10, 12 are also simultaneously or subsequently active.

FIG. 6 illustrates the cross horizontal section of a control system portal in accordance with an alternative of the invention using in a first housing 10 two emitting coils 3, 5 and in the second housing 12 two receiving coils 3, 5.

More precisely, coil 3 of housing 10 is a transmitter one referenced TX1, coil 5 of housing 10 is also a transmitter one referenced TX2, coil 3 of housing 12 is a receiver one referenced RX1 and coil 5 of housing 12 is also a receiver one referenced RX2. In other words two transmitter coils TX1 and TX2 are placed on one side in a housing 10 and the two receiver coils RX1 and RX2 are placed on the other side in the second housing 12. The RX1 coil receives the signal issued by the TX1 coil and the signal issued by the TX2 coil. The same behaviour applies to RX2.

Of course the same detector may operate subsequently in the two modes illustrated respectively on FIGS. 5 and 6.

Moreover each receiver coil RX may subsequently operates as an emitting one TX and conversely each emitting coil TX may subsequently operates as a receiver one RX.

In the other words according to FIG. 6 each of the two housings 10, 12 comprises two emitting coils TX or two receiving RX and the detector comprises means controlling operation of said emitting and receiving coils so that when an emitting coil TX provided in a housing 10 or 12 is active, the two receiving coils RX provided in the other housing are also simultaneously or subsequently active.

This layout allows discrimination of the masses carried laterally and/or centrally, by people in transit and eliminates directional effects due to the orientation of lengthened metal masses.

This solution allows the metal detector to achieve a better discrimination than the prior art, thanks to the possibility to generate with TX1, in a specific moment and giving a determined frequency, an electromagnetic field which is received at the same time by RX1 and RX2.

Afterwards or simultaneously, TX2 generates its own magnetic field that will be received by RX1 and RX2 as an induced electromagnetic force.

In this way, thanks to the crossed position of field generators and field receivers, it is easier to detect also laminar metal masses placed in the different orientations. The general directions of the respective emitted electromagnetic fields are illustrated under references C, D, E and F on FIG. 5 and G, H, I and J on FIG. 6. These figures clearly show that the invention leads to a plurality of crossed electromagnetic fields.

The above is an additional peculiarity of the column shape transducers that, beside their transmitting and receiving windings, improves their uniformity and discrimination characteristics.

By means of two column shape transmitting and two column shape receiving systems, thanks to the signals received and analysed, the present invention now offers a considerable improvement in the discrimination and considerably reduces the false alarm.

It is also common knowledge that the reduction of false alarms speeds up the inspection of passengers, saving time and personnel.

Figure 13:
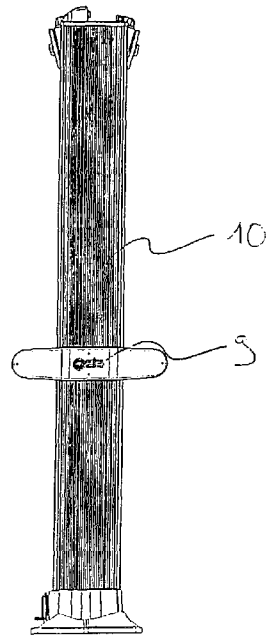
FIG. 13 is a lateral view of a detector in accordance with the present invention.

Another advantage of the invention is to warrant that all the active sensors, such as metal, radioactive, chemical or badge sensors, which are located in the same portal detector operate on a single and the same individual, versus prior art and separate sensors which can be erroneously influenced by a plurality of people leading to a possible false alarm. If necessary the sensing operation by the different sensors may be controlled by a means 9, such as a photoelectric barrier, suitable to detect when an individual penetrates into the portal, so as to assure that the detection is operated when such an individual is inside the portal, between the two housings 10, 12. FIG. 13 illustrates an embodiment of such a photoelectric barrier 9.

FIGS. 7 and 8 illustrate another specific embodiment in accordance with the present invention wherein at least one of the two housings 10, 12, and preferably both two housings 10, 12, is (are) provided with a plurality of X/Gamma sensors 40. Said X/Gamma sensors 40 are staggered on the height of the housing 10, 12, so as to cover all the height of said housing.

Dividing the means suitable to detect the X/Gamma rays in a plurality of sensors allows to determine easily the location, i.e. the place in height, of any detected X/Gamma rays source.

Figure 15:
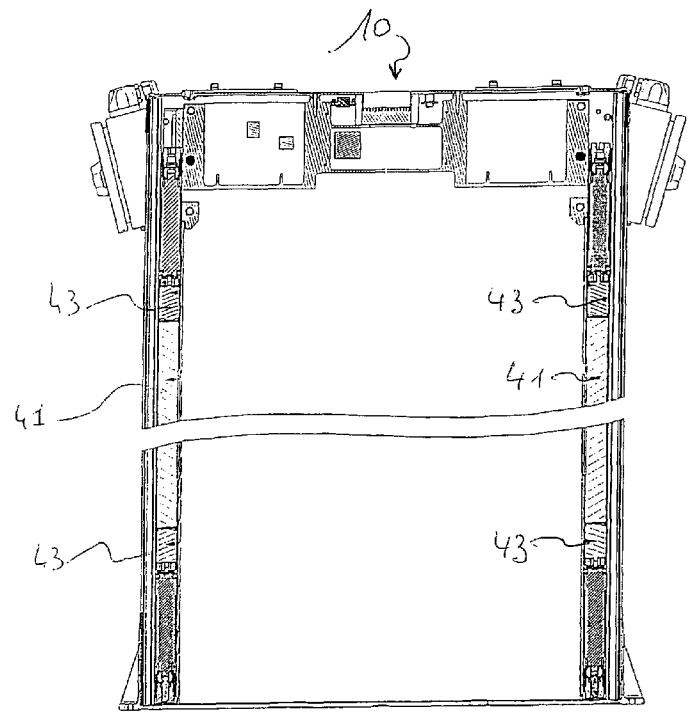
FIG. 15 is a cross vertical and longitudinal section of the same detector in accordance with an embodiment in form of a panel detector of the present invention.

The FIG. 15 illustrates another disposition of the X/Gamma detector. This detector is composed of one scintillator 41 and two photo-detectors 43 disposed on each extremity of the scintillator 41. The sum of the two photo-detectors' signals determines the amplitude of the radiation and the ratio of those two signals gives an information on the location, i.e. the place in height, of any detected X/Gamma rays source. The photo-detectors are expensive, so this solution consisting in using only two photo-detectors in order to have access to the amplitude and the location of the X/Gamma radiation source is compact and low cost.

Moreover in accordance with the present invention the detector is preferentially provided with a general control means or general control Unit suitable to control and to change if necessary the sensitivity of one type of sensor in view of the signal outputted by another type of sensor.

More precisely in accordance with a specific embodiment of the present invention, the metal detector corresponding to the emitting and receiving coils, TX and RX, associated with control means, comprise at least a channel which is particularly adapted to detect lead (Pb) component (while other channels are suitable to detect other metals such as iron) as well as means suitable to increase sensitivity of said X/Gamma rays sensors 40 when said metal detector detects the presence of lead component. Such a provision allows to detect for example the presence of lead casing enclosing a radioactive source.

The above described provision of sensors staggered to cover all the height of a housing and the coupling of two types of sensors so as to change the sensibility of one type of sensor depending on the output of the other type of sensor, is not limited to X/Gamma sensors but covers any kind of sensors compatible with the present invention.

Figure 9:
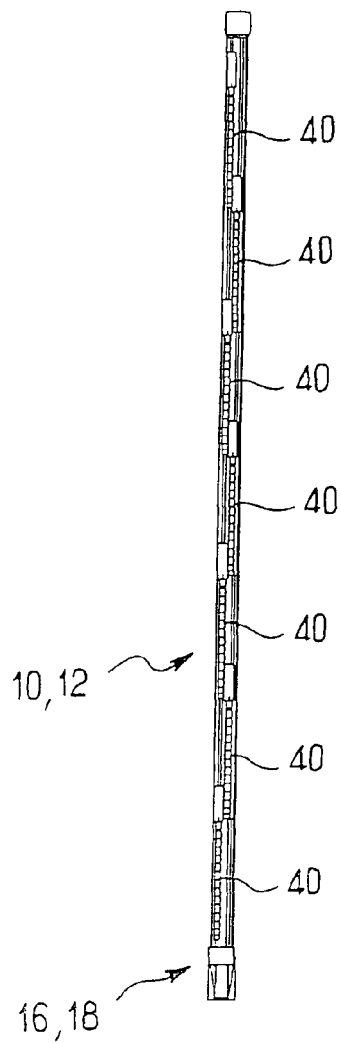
FIGS. 9 and 10 illustrate views similar to FIGS. 8 and 9 of a detector in conformity of another specific embodiment of the present invention.
Figure 10:
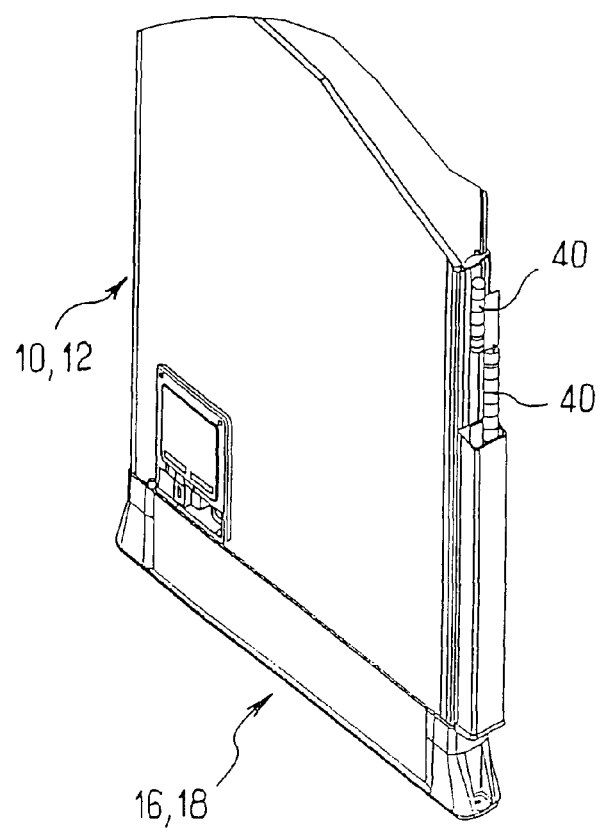

FIGS. 9 and 10 illustrate views respectively similar to FIGS. 7 and 8 of another detector in accordance with the invention including X/Gamma sensors staggered on the height of a housing in the case the housing is in the form of a panel and houses planar coils 3, 5.

The man skilled in the art can obviously see the advantages of this invention in comparison with the metal detector disclose in the prior art document WO03/069320. The physical and geometrical coincidences detection of the invention enable a simultaneous spatial and temporal detection of metal and radiation phenomenon. When the coils and the additional types of sensors are separately located, this could lead to an unreliable or false detection.

The invention claimed is:

1. A metal detector for control of protected access zone comprising two oblong shape vertical housings, and emitting and receiving electrical coils provided in said housings, wherein at least a X/Gamma sensor is provided in at least one of said housings, said coils and X/Gamma sensor being provided symmetrically in regard to said coils in said at least one of said housings so as to present physical and geometrical coincidence detections and wherein said emitting and receiving coils are associated with control means adapted to detect a lead component, said metal detector further comprising a control unit which automatically increases the sensitivity of the X/Gamma sensor when said control means detects the presence of a lead component.

2. Detector according to claim 1, characterized in that it comprises at least two metal detector coils (3, 5), one of said two metal detector coils (3, 5) being provided respectively on each side of a central sensor (4).

3. Detector according to claim 1, characterized in that said additional type of sensor (4) is chosen in the group comprising at least one sensor suitable to detect ionizing radiations, at least one sensor suitable to detect the presence of explosive material or other specific substances and at least one sensor suitable for the badge readings of persons in transit.

4. Detector according to claim 1 characterized in that the emitting and receiving electrical coils (3, 5) are of column type.

5. Detector according to claim 4, characterized in that the emitting and receiving electrical coils (3, 5) of column type comprise helicoidal windings round about a cylindrical support core.

6. Detector according to claim 1, characterized in that the emitting and receiving electrical coils (3) are of flat panel type.

7. Detector according to claim 6, characterized in that the cross section of the housing (10) is of elongate and rectangular form.

8. Detector according to claim 1, characterized in that it comprises a badge reader associated to the emitting and receiving electrical coils (3, 5).

9. Detector according to claim 1, characterized in that it comprises indicator means (30) on said housings (10, 12) and/or on said structure (14) connecting the upper part of said housings.

10. Detector according to claim 1, characterized in that it comprises at least one symmetry plane (A, B).

11. Detector according to claim 1, characterized in that it comprises two symmetry planes (A, B).

12. Detector according to claim 1, characterized in that at least one of the two housings (10, 12) comprises at least two separate emitting and/or receiving coils (3, 5).

13. Detector according to claim 12, characterized in that at least two separate emitting and receiving coils (3, 5) are provided respectively on each side of one said additional detector (4).

14. Detector according to claim 1, characterized in that the ratio between the length and the width of the cross-section of the housings (10, 12) is comprised between 2 and 4, preferably about 2.75.

15. Detector according to claim 1, characterized in that the length of the cross section of the housings (10, 12) is comprised between 60 and 100 cm, preferably about 80 cm while the width of said cross section is comprised between 20 and 35 cm, preferably about 27.5 cm.

16. Detector according to claim 1, characterized in that the cross section of the housings (10, 12) is of elliptical form.

17. Detector according to claim 1, characterized in that the external surface of each housing (10, 12) comprises two plane and parallel panels (20, 22) connected at their ends by two rounded parts (24, 26).

18. Detector according to claim 1, characterized in that the external surface of said housings does not comprise any sharp edge.

19. Detector according to claim 1, characterized in that the external surface of the housing is smooth or striped with omega shape indentations to reduce optical reflection of light.

20. Detector according to claim 1, characterized in that each of the two housings (10, 12) comprises two separate respectively emitting and/or receiving coils (3, 5).

21. Detector according to claim 20, characterized in that it comprises means controlling operation of said emitting and receiving coils (3, 5) so that when an emitting coil (3, TX1, TX2) provided in a housing (10, 12) is active, two other and spatially separate receiving coils (5, RX1, RX2) are also simultaneously or subsequently active.

22. Detector according to claim 21, characterized in that it comprises means controlling operation of said emitting and receiving coils (3, 5) so that two emitting coils (3, TX1, TX2) are subsequently or simultaneously active, and when an emitting coil (3, TX1, TX2) is active, two receiving coils (5, RX1, RX2) are also simultaneously or subsequently active.

23. Detector according to claim 1, characterized in that each of the two housings (10, 12) comprises one emitting coil (TX) and one receiving coil (RX) and the detector comprises means controlling operation of said emitting and receiving coils so that when an emitting coil (TX1, TX2) provided in a housing (10, 12) is active, the two receiving coils (RX1, RX2) provided respectively in both the two housings are also simultaneously or subsequently active.

24. Detector according to claim 1, characterized in that each of the two housings (10, 12) comprises two emitting coils (TX1, TX2) or two receiving coils (RX1, RX2) and the detector comprises means controlling operation of said emitting and receiving coils so that when an emitting coil (TX1, TX2) provided in a housing is active, the two receiving coils (RX1, RX2) provided in the other housing are also simultaneously or subsequently active.

25. Detector according to claim 1, characterized in that all the information issued by the plurality of sensors (3, 4, 5), such as metal, radioactive, chemical or badge sensors, are displayed on a common signaling display (2).

26. Detector according to claim 1, characterized in that all the active detectors (3, 4, 5), such as metal, radioactive, chemical or badge sensors, which are located in the same portal detector operate on a single and the same individual.

27. Detector according to claim 1, characterized in that the sensing operation by the different detectors (3, 4, 5) is controlled by a means (9), such as a photoelectric barrier, suitable to detect when an individual penetrates into the portal, so as to assure that the detection is operated when such an individual is inside the portal, between the two housings (10, 12).

28. Detector according to claim 1, characterized in that it comprises at least an additional type of sensor which is divided into a plurality of individual sensors which are staggered on the height of a housing (10, 12) so as to cover all the height of said housing.

29. Detector according to claim 1, characterized in that it comprises a plurality of X/Gamma sensors (40) staggered on the height of a housing (10, 12) so as to cover all the height of said housing (10, 12).

30. Detector according to claim 1, characterized in that it comprises a X/Gamma sensors composed of a scintillator (41) having two extremities and two photo-detectors (43) on each extremity.

31. Detector according to claim 30, characterized in that it comprises means suitable to operate the sum of the outputs of said two photo-detectors (43) so as to provide an amplitude signal and to operate the ratio of the outputs of said two photo-detectors (43) so as to provide a location signal.

32. Detector according to claim 1, characterized in that it comprises at least two kind of sensors as well as a control unit suitable to control and to change when necessary the sensitivity of one type of sensor in view of the output of another type of sensor.

33. Detector according to claim 1, wherein the emitting and receiving coils are provided symmetrically respectively on each side of the X/Gamma sensor.

34. Detector according to claim 1, wherein the emitting and receiving coils are provided on a common support and two X/Gamma sensors are provided symmetrically respectively on each side of said emitting and receiving coils.

* * * * *